United States Patent [19]

Dehennau

[11] Patent Number: 4,585,694
[45] Date of Patent: Apr. 29, 1986

[54] MULTI-LAYERED THERMOPLASTIC STRUCTURES COMPRISING A LAYER OF A VINYL OR VINYLIDENE FLUORIDE POLYMER BONDED TO A LAYER OF AN ALPHA-OLEFIN POLYMER

[75] Inventor: Claude Dehennau, Waterloo, Belgium

[73] Assignee: Solvay & Cie (Societe Anonyme), Brussels, Belgium

[21] Appl. No.: 603,917

[22] Filed: Apr. 25, 1984

[30] Foreign Application Priority Data

Apr. 27, 1983 [FR] France ................. 83 07087

[51] Int. Cl.[4] ............................................. C07J 7/02
[52] U.S. Cl. ................... 428/355; 428/421; 428/520; 428/522; 525/222
[58] Field of Search ........... 428/520, 522, 355; 525/222

[56] References Cited

U.S. PATENT DOCUMENTS

| | | | |
|---|---|---|---|
| 3,519,531 | 7/1970 | James et al. | 161/254 |
| 4,006,741 | 2/1977 | Arluck | 428/319.7 |
| 4,424,240 | 1/1984 | Kielbania | 428/520 |

FOREIGN PATENT DOCUMENTS

| | | |
|---|---|---|
| 1484153 | 5/1967 | France . |
| 2181968 | 4/1973 | France . |
| 1309011 | 3/1973 | United Kingdom . |

*Primary Examiner*—Edith Buffalow
*Attorney, Agent, or Firm*—Spencer & Frank

[57] ABSTRACT

Multi-layered thermoplastic structures comprising a layer of a vinyl or vinylidene fluoride polymer bonded to a layer of an alpha-olefin polymer with the joint aid of a vinyl acetate polymer and a copolymer of ethylene and vinyl acetate.

The multi-layered thermoplastic structures can be in the form of films, sheets, plates or tubes which can be used in the field of protection from corrosion or ultra-violet rays.

18 Claims, No Drawings

MULTI-LAYERED THERMOPLASTIC STRUCTURES COMPRISING A LAYER OF A VINYL OR VINYLIDENE FLUORIDE POLYMER BONDED TO A LAYER OF AN ALPHA-OLEFIN POLYMER

The present invention relates to multi-layered thermoplastic structures comprising a layer of a vinyl or vinylidene fluoride polymer bonded to a layer of an alpha-olefin polymer, and more particularly to those multi-layered structures in which the vinyl or vinylidene fluoride polymer is bonded to the alpha-olefin polymer by means of polymeric adhesives.

BACKGROUND OF THE INVENTION

Vinyl fluoride polymers and vinylidene fluoride polymers are thermoplastic polymers which have a combination of useful properties and, in particular, a high chemical inertness, an excellent resistance to weathering and ultra-violet rays and a good impermeability to gases and vapours. Because of this, they have many uses in very diverse fields, and in particular in protection from corrosion. Nevertheless, they have the disadvantage of being relatively expensive, which is likely to limit their applications. A suitable means of reducing the cost of shaped articles of vinyl or vinylidene fluoride polymers comprises using these polymers in the form of multi-layered thermoplastic structures (films, sheets, plates, tubes and the like), in which they are associated with bulk thermoplastic polymers which impart to them, in addition, their own properties and advantages, such as, for example, mechanical strength. However, said fluorinated polymers adhere very poorly to other thermoplastic polymers, and especially to alpha-olefin polymers, so that it is generally necessary to resort to adhesives, most frequently polymeric adhesives, to ensure an adhesive bond between these fluorinated polymers and other thermoplastic polymers.

French Pat. No. A-1,484,153 (THE DOW CHEMICAL CO) recommends the bonding of a layer of polyolefin to a layer of a fluorinated hydrocarbon polymer with the aid of a polymeric adhesive consisting of, preferably, a copolymer of ethylene and vinyl acetate containing about 13 to 35% by weight of vinyl acetate.

It has now been found that multi-layered structures of the prior art in which a polyolefin is bonded to a fluorinated hydrocarbon polymer with the aid of a copolymer of ethylene and vinyl acetate containing 13 to 35% by weight of vinyl acetate are sensitive to delamination at the fluorinated polymer layer.

SUMMARY OF THE INVENTION

The object of the present invention is to obtain multi-layered thermoplastic structures comprising a layer of a vinyl or vinylidene fluoride polymer bonded to a layer of an alpha-olefin polymer which do not have the above-mentioned disadvantage.

For this purpose, the invention provides multi-layered thermoplastic structures comprising a layer of a vinyl or vinylidene fluoride polymer bonded to a layer of an alpha-olefin polymer with the joint aid of a vinyl acetate polymer and a copolymer of ethylene and vinyl acetate.

DETAILED DESCRIPTION OF THE EMBODIMENT

Multi-layered structures comprising a layer of a vinyl or vinylidene fluoride polymer bonded to a layer of an alpha-olefin polymer are understood as meaning multi-layered structures containing at least one layer of a vinyl or vinylidene fluoride polymer bonded to at least one layer of an alpha-olefin polymer. The multi-layered thermoplastic structures according to the invention can thus contain one or more layers of vinyl or vinylidene fluoride polymer bonded to one or more layers of alpha-olefin polymer, and these layers can themselves be bonded to layers of other polymers.

It has been found that, in contrast to the copolymers of ethylene and vinyl acetate recommended in the prior art for bonding a fluorinated hydrocarbon polymer to a polyolefin, vinyl acetate polymers adhere perfectly to vinyl and vinylidene fluoride polymers. In addition, these vinyl acetate polymers are compatible with and adhere perfectly to copolymers of ethylene and vinyl acetate.

The invention thus essentially rests in the joint utilisation of a vinyl acetate polymer and a copolymer of ethylene and vinyl acetate for bonding and adhering a layer of a vinyl or vinylidene fluoride polymer to a layer of an alpha-olefin polymer in producing multi-layered structures.

Vinyl acetate polymer is understood as meaning both the homopolymer and binary copolymers of vinyl acetate and ethylene containing at least 50% by weight of vinyl acetate. The best results are obtained with binary copolymers of vinyl acetate and ethylene containing 60 to 90% by weight of vinyl acetate, and more particularly with those containing 70 to 85% by weight of vinyl acetate, which are consequently preferred.

Copolymer of ethylene and vinyl acetate is understood as meaning binary copolymers of ethylene and vinyl acetate containing at least 50% by weight of ethylene. The best results are obtained with copolymers of ethylene and vinyl acetate containing 60 to 95% by weight of ethylene, and more particularly with those containing 75 to 90% by weight of ethylene, which are consequently preferred.

Preferred multi-layered thermoplastic structures are those in which a layer of a vinyl or vinylidene fluoride polymer is bonded to a layer of an alpha-olefin polymer with the joint aid of a binary copolymer of vinyl acetate and ethylene containing 60 to 90% by weight of vinyl acetate, and a binary copolymer of ethylene and vinyl acetate containing 60 to 95% by weight of ethylene.

Vinyl or vinylidene fluoride polymer is understood as meaning any polymer containing at least 85 mol %, and preferably at least 90 mol %, of monomer units derived from vinyl fluoride or from vinylidene fluoride. Vinyl and vinylidene fluoride polymers which are suitable in producing the multilayered structures according to the invention thus comprise both homopolymers of vinyl fluoride and of vinylidene fluoride and copolymers of vinyl or vinylidene fluoride containing monomer units derived from one or more comonomers. Vinyl and vinylidene fluoride polymers containing at least 90 mol % of monomer units derived from vinyl or vinylidene fluoride are preferred, the remainder, where relevant, preferably consisting of monomer units derived from other fluorinated olefins, such as vinylidene fluoride, vinyl fluoride, trifluoroethylene, chlorotrifluoroethylene, tetrafluoroethylene and hexafluoropropylene. The homopolymers of vinyl fluoride and of vinylidene fluoride are particularly preferred and still more particularly the monopolymer of vinylidene fluoride.

Alpha-olefin polymer is understood as meaning polymers containing at least 50 mol %, and preferably at least 75 mol of olefins which have a terminal unsaturation and the molecule of which contains 2 to 18 carbon atoms, and preferably 2 to 8 carbon atoms, such as ethylene, propylene, but-1-ene, pent-1-ene, the methylbut-1-enes, hex-1-ene, the 3- and 4-methylpent-1-enes, vinylcyclohexene and styrene. Homopolymers of said alpha-olefins and copolymers of these alpha-olefins with one another or with diolefins containing 4 to 18 carbon atoms, such as non-conjugated aliphatic diolefins, such as hexa-1,4-diene, for example, or such as alicyclic diolefins having an endocyclic bridge, such as dicyclopentadiene, for example, are preferred. Particularly preferred alpha-olefin polymers are polyethylene (high-density or low-density), polypropylene and polystyrene. Polyethylene is a very particularly preferred alpha-olefin polymer.

The method of obtaining the multi-layered structures according to the invention is not critical. Any of the usual techniques for assembling layers of thermoplastic polymers to produce the multi-layered structures according to the invention can thus be used, such as, for example, gluing in the cold with the aid of a solution of the polymeric adhesives in a suitable solvent. Nevertheless, the preferred techniques are hot assembly techniques in which the constituent polymers are used at a temperature at least equal to their softening point, such as coating, coextrusion or coextrusion/coating, which are, besides, techniques which are in themselves well-known for conversion of plastics.

The manner in which the polymeric adhesives are used is of course adapted to the method chosen for combining the polymeric layers constituting the multi-layered structures. Depending on the case, the vinyl acetate polymer and the copolymer of ethylene and vinyl acetate are used separately and constitute two distinct adhesive layers, or are used as a mixture, in which case they constitute a single adhesive layer.

The multi-layered structures resulting from assembly by coating (hot pressing of preformed polymeric layers, for example, by extrusion) comprise two distinct adhesive layers, that is to say a layer of a vinyl acetate polymer facing the layer of vinylidene fluoride polymer and a distinct layer of a copolymer of ethylene and vinyl acetate facing the layer of the alpha-olefin polymer. The multi-layered thermoplastic structures according to the invention which result from assembly by coating thus comprise at least four distinct polymeric layers essentially consisting of, in order, a layer of a vinyl or vinylidene fluoride polymer, a layer of a vinyl acetate polymer, a layer of a copolymer of ethylene and vinyl acetate and a layer of an alpha-olefin polymer.

The multi-layered structures resulting from assembly by coextrusion or by coextrusion/coating contain a single adhesive layer consisting of a mixture of a vinyl acetate polymer and a copolymer of ethylene and vinyl acetate. This mixture advantageously contains 25 to 75% by weight of vinyl acetate polymer, and preferably about 50% by weight of the vinyl acetate polymer.

The multi-layered thermoplastic structures according to the invention which result from assembly by coextrusion or by coextrusion/coating thus comprise at least three polymeric layers essentially consisting of, in order, a layer of a vinyl or vinylidene fluoride polymer, a layer of a mixture of a vinyl acetate polymer and a copolymer of ethylene and vinyl acetate and a layer of an alpha-olefin polymer.

In the case where the multi-layered structures are produced by coextrusion or by coextrusion/coating, it is particularly advantageous to use a mixture of a vinyl acetate polymer and a copolymer of ethylene and vinyl acetate having different dynamic viscosities. In practice, in a manner which is known per se, the dynamic viscosity of the two adhesive polymers used in the form of a mixture is adapted to the equipment and to the relative thickness of the various polymeric layers, such that a predominant amount of the vinyl acetate polymer is situated along the layer of vinyl or vinylidene fluoride polymer and a predominant amount of the copolymer of ethylene and vinyl acetate is situated along the layer of an alpha-olefin polymer. The optimum dynamic viscosities of the vinyl acetate polymer and of the copolymer of ethylene and vinyl acetate are thus advantageously evaluated experimentally in each case on the coextrusion or coextrusion/coating apparatus chosen.

It is obvious that the multi-layered structures according to the invention can contain additional polymeric layers, such as, for example, layers consisting of scrap polymer originating from recycling, or layers of thermoplastic polymers other than polymers of vinyl or vinylidene fluoride and alpha-olefins. Nevertheless, preferred multi-layered thermoplastic structures are those which result from assembly by coating and which contain four polymeric layers, and those which result from assembly by coextrusion or by coextrusion/coating and contain three polymeric layers. Particularly preferred multi-layered thermoplastic structures are those which result from assembly by coextrusion.

It is also obvious that each of the polymers constituting the multi-layered structures according to the invention can contain the customary additives used when this polymer is employed, such as, for example, lubricants, plasticisers, heat stabilisers, light stabilisers, fillers, pigments and the like. It is particularly advantageous to incorporate a UV-stabiliser into the vinyl or vinylidene fluoride polymer or the adhesive polymers in order to protect the alpha-olefin polymer. Likewise, it may be advantageous to incorporate a small amount, for example up to about 10% by weight, of a suitable adhesive polymer into the polymers constituting the multi-layered structures.

The thickness of the polymeric layers which constitute the multi-layered structure according to the invention and the total thickness of these structures is not critical and of course depends on the intended use of these structures. The multi-layered thermoplastic structures according to the invention may thus be in the form of films, sheets, plates, tubes and the like.

The multi-layered thermoplastic structures according to the invention may advantageously be used, in the form of films, sheets, plates or tubes and the like, in fields of application which require a high chemical inertness, such as in the chemical, pharmaceutical and food-stuffs industries, or a high resistance to ultra-violet rays, such as, for example, in the production of films in agriculture.

The examples which follow illustrate the invention, but without limiting it. Examples 1 and 2, according to the invention, relate to coextruded thermoplastic structures with three layers consisting of, in order, a layer of a vinylidene fluoride homopolymer (polyvinylidene fluoride of trademark SOLEF and Grade 1008 produced and marketed by SOLVAY & CIE), a layer of a 1:1 mixture of a vinyl acetate polymer and a copolymer of ethylene and vinyl acetate, and a layer of an ethylene homopolymer (high-density polyethylene of trademark ELTEX and Grade B5920, produced and marketed by SOLVAY & CIE).

Example 3, for reference, relates to a thermoplastic structure with three layers consisting of, in order, a layer of a polyvinylidene fluoride of trademark SOLEF and Grade 1008, a layer of a copolymer of ethylene and vinyl acetate, and a layer of a high-density polyethylene of trademark ELTEX and Grade B5920.

Three extruders feeding a special coextrusion head are used to produce the coextruded thermoplastic structures with three layers in Examples 1 to 3.

The three extruders, referred to respectively by the indices A, B and C, are as follows:
- on extruder A, of the single-screw Troester EP30 type having a screw length 20 times the diameter and a compression ratio of 2, a high-density polyethylene (HDPE) of trademark Eltex and Grade B5920 is extruded. The heating temperatures shown from the feed zone to the pumping zone are, respectively, 195° C.-210° C.-215° C.-220° C.;
- on extruder B, of the single-screw Brabender Laborextruder 20D type with a screw length 20 times the diameter and a compression ratio of 4, the abovementioned polymeric adhesives are extruded. The heating temperatures shown in the feed zone and the pumping zone are, respectively, 90 to 140° C.;
- on extruder C, of the single-screw Thoret 20 mm type, with a screw length 15 times the diameter and a compression ratio of 3.5, polyvinylidene fluoride (PVDF) of trademark SOLEF and Grade 1008 is extruded. The heating temperatures shown are 200° and 210° C. in this case.

The special coextrusion head consists of a flow distributor and a coextrusion die with two inlet channels (a and b) and one outlet channel (c). The temperature of this coextrusion head is kept at 215° C.

Extruders B and C feed the flow distributor connected to inlet channel a of the coextrusion die. Extruder A feeds channel b of the coextrusion die. Channels a and b end in channel c, 0.75 mm thick and 21 mm long, where the coextruded thermoplastic structures with three layers according to Examples 1, 2 and 3 are formed.

The flows through the three extruders are regulated such that the thickness of the layers is about 0.25 mm for the HDPE, about 0.15 mm for the polymeric adhesives and about 0.1 mm for the PVDF.

The adhesion test is carried out on a dynamometer of the FRANK 650 type in accordance with a method close to that of Standard ASTM D 1876-72.

Table I below shows the nature and viscosity of the polymeric adhesives and the results of the evaluation of the adhesion.

TABLE I

| | Polymeric adhesives | | | | |
|---|---|---|---|---|---|
| | Binary copolymer of ethylene and vinyl acetate | | Vinyl acetate polymer | | Adhesion, |
| Example No. | Ethylene content, % by weight | Dynamic viscosity* Pa · second | Acetate content, % by weight | Dynamic viscosity* Pa · second | Newtons/ cm |
| 1 | 80 | $9.5 \cdot 10^2$ | 100 | $2.0 \cdot 10^3$ | 1.1 |
| 2 | 80 | $6.0 \cdot 10^3$ | 75 | $3.4 \cdot 10^3$ | 2.19 |
| 3 | 80 | $9.5 \cdot 10^2$ | none | | 0 |

*The dynamic viscosity is evaluated at 150° C. with a velocity of 10 seconds$^{-1}$.

I claim:

1. Multi-layered thermoplastic structures comprising a layer of a vinyl or vinylidene fluoride polymer bonded to a layer of an alpha-olefin polymer, characterized in that the layer of a vinyl or vinylidene fluoride polymer is bonded to the layer of an alpha-olefin polymer using both a vinyl acetate polymer and a copolymer of ethylene and vinyl acetate as polymeric adhesives.

2. Multi-layered thermoplastic structures according to claim 1, characterized in that the vinyl acetate polymer is a binary copolymer of vinyl acetate and ethylene containing 60 to 90% by weight of vinyl acetate.

3. Multi-layered thermoplastic structures according to claim 1, characterized in that the copolymer of ethylene and vinyl acetate is a binary copolymer of ethylene and vinyl acetate containing 60 to 95% by weight of ethylene.

4. Multi-layered thermoplastic structures according to claim 1, characterized in that the vinyl or vinylidene fluoride polymer is a homopolymer of vinylidene fluoride.

5. Multi-layered thermoplastic structures according to claim 1, characterized in that the vinyl or vinylidene fluoride polymer is a homopolymer of vinyl fluoride.

6. Multi-layered thermoplastic structures according to claim 1, characterized in that the alpha-olefin polymer is chosen from polyethylene, polypropylene and polystyrene.

7. Multi-layered thermoplastic structures according to claim 6, characterized in that the alpha-olefin polymer is polyethylene.

8. Multi-layered thermoplastic structures according to claim 1, characterized in that the vinyl acetate polymer and the copolymer of ethylene and vinyl acetate constitute two distinct layers.

9. Multi-layered thermoplastic structures according to claim 8, characterized in that they result from assembly by coating and in that they contain four layers consisting of, in order, a vinyl or vinylidene fluoride polymer, a vinyl acetate polymer, a copolymer of ethylene and vinyl acetate, and an alpha-olefin polymer.

10. Multi-layered thermoplastic structures according to claim 1, characterized in that the vinyl acetate polymer and the copolymer of ethylene and vinyl acetate constitute a single layer.

11. Multi-layered thermoplastic structures according to claim 10, characterized in that they result from assembly by coextrusion or by coextrusion/coating and in that they contain three layers consisting of, in order, a vinyl or vinylidene fluoride polymer, a mixture of a vinyl acetate polymer and a copolymer of ethylene and vinyl acetate, and an alpha-olefin polymer.

12. Multi-layered thermoplastic structures according to claim 1, characterized in that the vinyl acetate polymer is a homopolymer of vinyl acetate.

13. Method for preventing delamination in a multi-layered thermoplastic structure comprising a layer of vinyl or vinylidene fluoride polymer bonded to a layer of an alpha-olefin polymer, comprising bonding said layers together using an adhesive consisting of a copolymer of ethylene and vinyl acetate and a vinyl acetate polymer.

14. The method of claim 13, wherein the vinyl acetate polymer and the copolymer of ethylene and vinyl acetate are mixed together before being applied as an adhesive to at least one of the vinyl or vinylidene fluoride polymer or alpha-olefin polymer layers.

15. The method of claim 13, wherein the vinyl acetate polymer is applied to the vinyl or vinylidene fluoride polymer layer and the copolymer of ethylene and vinyl acetate is applied to the alpha-olefin polymer layer, and said layers are pressed together with the surfaces to which the adhesives were applied facing each other.

16. A multi-layered thermoplastic structure, comprising:

a fluorinated polymer layer comprised of a fluorinated polymer selected from the group consisting of homopolymers of vinyl fluoride, homopolymers of vinylidene fluoride and copolymers of vinyl fluoride and vinylidene fluoride;

an olefinic polymer layer comprised of an alpha-olefin polymer; and an adhesive layer positioned between the fluorinated polymer layer and the olefinic polymer layer for bonding same to one another, the adhesive layer being comprised of a vinyl acetate polymer and a copolymer of ethylene and vinyl acetate, said vinyl acetate polymer having at least 50% by weight vinyl acetate, and said copolymer having at least 50% by weight ethylene.

17. A multi-layered thermoplastic structure according to claim 16, wherein said adhesive layer is a double-layer comprising a vinyl acetate polymer layer which is positioned next to said fluorinated polymer layer and comprises at least 50% by weight vinyl acetate, and an ethylene vinyl acetate copolymer layer which is positioned next to said olefinic polymer layer and comprises at least 50% by weight ethylene.

18. A multi-layered thermoplastic structure according to claim 16, wherein said adhesive layer comprises a 1:1 weight ratio of said vinyl acetate polymer and said copolymer of ethylene and vinyl acetate.

* * * * *